US009524702B2

(12) United States Patent
Ukigaya et al.

(10) Patent No.: US 9,524,702 B2
(45) Date of Patent: Dec. 20, 2016

(54) DISPLAY CONTROL DEVICE, DISPLAY CONTROL METHOD, AND RECORDING MEDIUM

(71) Applicant: Sony Corporation, Minato-ku (JP)

(72) Inventors: Atsuo Ukigaya, Kanagawa (JP); Hiroshi Kimoto, Tokyo (JP); Tomohiko Gotoh, Kanagawa (JP); Makoto Murata, Tokyo (JP); Takeshi Yaeda, Kanagawa (JP); Naoki Shibuya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 14/288,829

(22) Filed: May 28, 2014

(65) Prior Publication Data
US 2015/0035859 A1 Feb. 5, 2015

(30) Foreign Application Priority Data

Aug. 1, 2013 (JP) ................................ 2013-160460

(51) Int. Cl.
G09G 5/377 (2006.01)
H04N 5/272 (2006.01)
G06K 9/62 (2006.01)
G06T 7/00 (2006.01)

(52) U.S. Cl.
CPC .............. *G09G 5/377* (2013.01); *H04N 5/272* (2013.01); *G06K 9/6202* (2013.01); *G06T 7/0044* (2013.01); *G09G 2340/10* (2013.01)

(58) Field of Classification Search
None
See application file for complete search history.

(56) References Cited

U.S. PATENT DOCUMENTS

| 8,270,764 B1* | 9/2012 | Agarwala | G06T 11/60 345/629 |
|---|---|---|---|
| 8,866,848 B2* | 10/2014 | Ishihara | G06T 15/503 345/619 |
| 2006/0120623 A1* | 6/2006 | Tsukamoto | G06T 1/0007 382/284 |
| 2012/0188283 A1* | 7/2012 | Ohashi | G06T 7/0081 345/660 |
| 2013/0033618 A1* | 2/2013 | Kato | G06T 7/0046 348/234 |
| 2014/0204246 A1* | 7/2014 | Nishi | H04N 5/2355 348/239 |

FOREIGN PATENT DOCUMENTS

JP 2012-253645 12/2012

* cited by examiner

*Primary Examiner* — Tize Ma
*Assistant Examiner* — Steven Elbinger
(74) *Attorney, Agent, or Firm* — Oblon, McClelland, Maier & Neustadt, L.L.P.

(57) ABSTRACT

There is provided a display control device including a display controller configured to cause a display part to display a first captured image. In a case where a modification target region is detected from the first captured image, the display controller causes the display part to display a composite image in which a part or all of a second captured image is composited on the modification target region.

21 Claims, 18 Drawing Sheets

DISPLAY CONTROL DEVICE, DISPLAY CONTROL METHOD, AND RECORDING MEDIUM

CROSS REFERENCE TO RELATED APPLICATIONS

This application claims the benefit of Japanese Priority Patent Application JP 2013-160460 filed Aug. 1, 2013, the entire contents of which are incorporated herein by reference.

BACKGROUND

The present disclosure relates to a display control device, a display control method, and a recording medium.

A captured image taken by a camera may include various types of noises. Many techniques have been disclosed for reducing such noises. For example, there is disclosed a technique for reducing noises included in a captured image by modifying the captured image itself (for example, see JP 2012-253645A).

SUMMARY

However, in the technique involving modifying a captured image itself, there is a case where it is difficult to modify a modification target region included in the captured image with high accuracy. In light of the foregoing, it is desirable to achieve a technique capable of modifying more accurately the modification target region included in the captured image.

According to an embodiment of the present disclosure, there is provided a display control device which includes a display controller configured to cause a display part to display a first captured image. In a case where a modification target region is detected from the first captured image, the display controller causes the display part to display a composite image in which a part or all of a second captured image is composited on the modification target region.

According to another embodiment of the present disclosure, there is provided a display control method which includes causing a display part to display a first captured image. In a case where a modification target region is detected from the first captured image, causing the display part to display a composite image in which a part or all of a second captured image is composited on the modification target region.

According to another embodiment of the present disclosure, there is provided a non-transitory computer-readable recording medium having a program recorded thereon, the program being for causing a computer to function as a display control device including a display controller configured to cause a display part to display a first captured image. In a case where a modification target region is detected from the first captured image, the display controller causes the display part to display a composite image in which a part or all of a second captured image is composited on the modification target region.

According to one or more of embodiments of the present disclosure, a technique can be provided capable of modifying more accurately a modification target region included in a captured image.

DETAILED DESCRIPTION OF THE EMBODIMENT(S)

Figure 1:
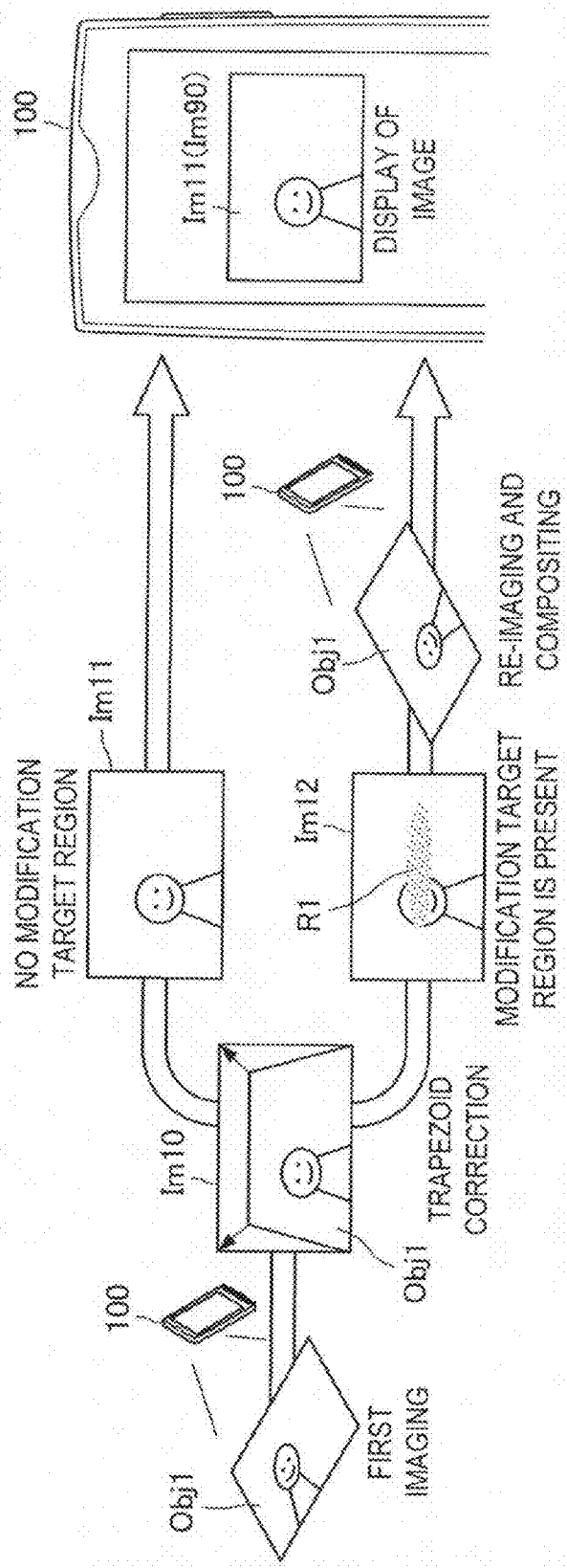
FIG. 1 is a diagram illustrating an overview of functions of a display control device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets after the same reference numeral. Note that, in the case where it is not necessary to distinguish the multiple structural elements that have substantially the same function and structure from one another, the multiple structural elements are denoted with the same reference numeral only.

Further, the "detailed description of the embodiments" will be described in the order shown below.

1. Overview of functions of display control device
2. Functional configuration example of display control device
3. Details of functions of display control device
4. Operation example of display control device
5. Hardware configuration example
6. Conclusion <<1. Overview of functions of display control device>>

First, an overview of functions of a display control device 100 according to an embodiment of the present disclosure will be described. FIG. 1 is a diagram illustrating an overview of functions of the display control device 100 according to an embodiment of the present disclosure. As shown in FIG. 1, for example, let us assume that a user considers saving a captured image of an imaging target Obj1. The imaging target Obj1 is not particularly limited, and may be a magazine or a book, may be a photograph, or may be a pamphlet or a ticket.

Further, the imaging target Obj1 may also be an advertisement or a poster, may be a picture or a character, may be a postcard, or may be a whiteboard. In addition, the imaging target Obj1 may also be scenery (for example, a starry sky).

Here, for example, when a user refers to a through image displayed by the display control device 100 and performs an imaging operation with a part or all of the imaging target Obj1 included in an imaging range, the display control device 100 images the imaging target Obj1 for the first time. As a result, the display control device 100 can acquire a captured image Im10 in which the imaging target Obj1 is shown. The captured image Im10 may be subjected to trapezoid correction, for example.

Although a description will hereinafter be given mainly of an example in which imaging is performed by the display control device 100, the imaging may also be performed by an imaging part provided outside the display control device 100. Further, although a description will hereinafter be given mainly of an example in which an image is displayed by the display control device 100, the image may also be displayed by a display part provided outside the display control device 100.

Further, a type of a terminal of the display control device 100 may be a video camera, a smartphone, a tablet terminal, or a personal digital assistant (PDA). Alternatively, a type of a terminal of the display control device 100 may be a digital camera, a personal computer (PC), a mobile phone, a mobile music playback device, a mobile video processing device, or a mobile game console.

The captured image Im10 obtained by the first imaging may include a modification target region, such as a reflection of light emitted from a light source, an obstacle gotten into the imaging range, a shade, a blur, or an unclear part. The modification target region may be detected by the display control device 100. In the case where the captured image Im10 does not include a modification target region (for example, in the case where a captured image Im11 is imaged), the display control device 100 may display the captured image Im11, which does not include any modification target region, as it is.

On the other hand, in the case where the captured image Im10 includes a modification target region (for example, in the case where a captured image Im12 including a modification target region R1 is imaged), the display control device 100 re-images the imaging target Obj1 in accordance with an imaging operation performed by the user. As a result, the display control device 100 can obtain a captured image in which the imaging target Obj1 is shown by the re-imaging. In this case, the display control device 100 may composite, on the modification target region R1 included in the captured image Im12, a region corresponding to the modification target region R1 included in the captured image obtained by the re-imaging, and may display the result as a composite image Im90. Note that the re-imaging may be performed automatically. That is, in the case where a modification target region is detected, the display control device 100 may automatically detect an overlap between a through image and the modification target region and may perform the re-imaging.

If, compared with the modification target region R1 included in the captured image Im10 obtained by the first imaging, a modification target region is reduced in the region corresponding to the modification target region R1 included in the captured image obtained by the re-imaging, a composite image Im90 can be obtained, the composite image Im90 having the reduced modification target region. In the present specification, there will be described in detail a technique capable of reducing more accurately the modification target region included in the captured image using the way shown in the example.

Heretofore, an overview of functions of the display control device 100 according to an embodiment of the present disclosure has been described.

<<2. Functional configuration example of display control device>>

Figure 2:
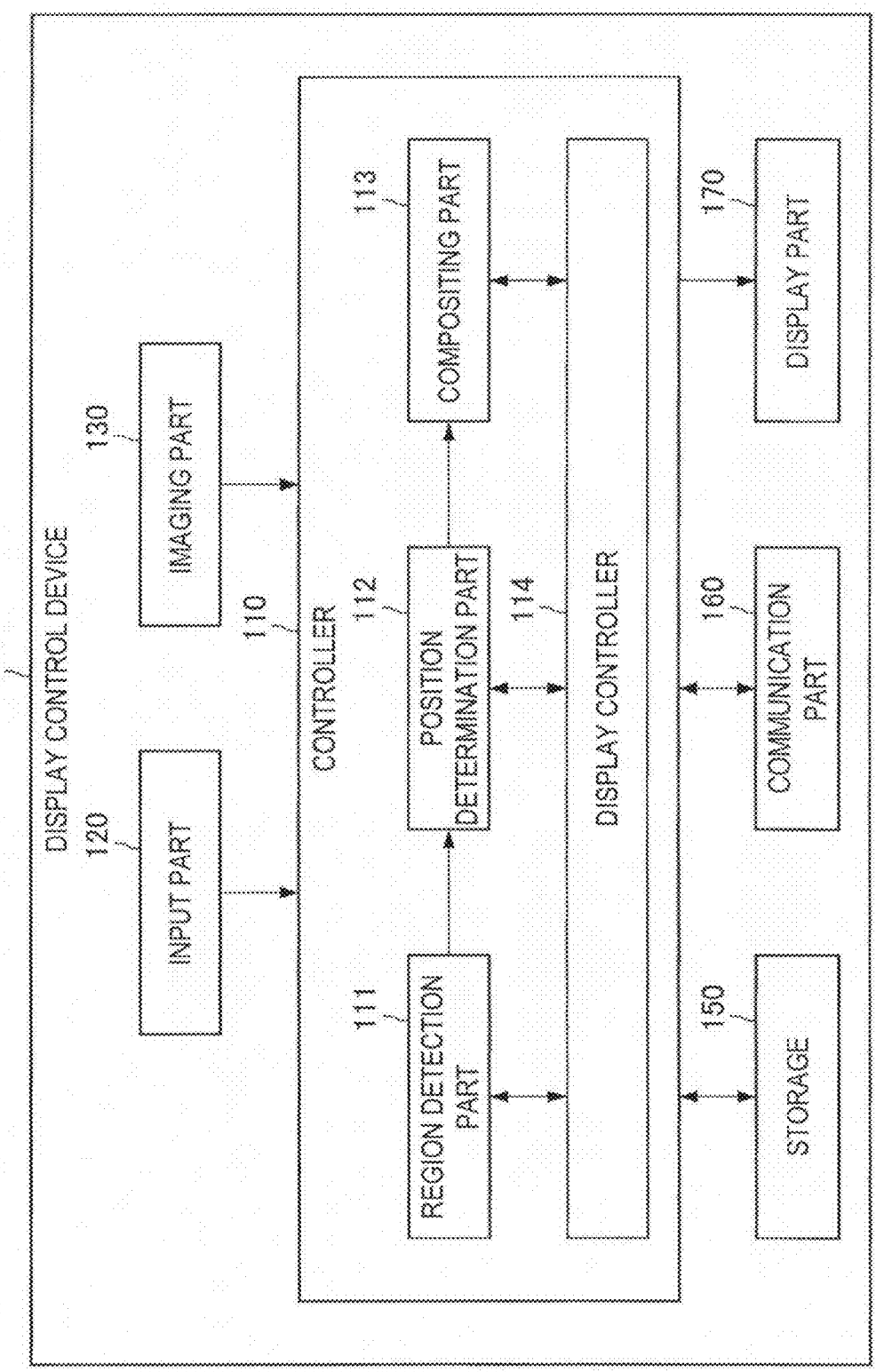
FIG. 2 is a diagram showing a functional configuration example of a display control device.

Next, a functional configuration example of the display control device 100 will be described. FIG. 2 is a diagram showing a functional configuration example of the display control device 100. As shown in FIG. 2, the display control device 100 includes a controller 110, an input part 120, an imaging part 130, a storage 150, a communication part 160, and a display part 170.

The controller 110 corresponds to a processor such as a central processing unit (CPU). The controller 110 executes a program stored in the storage 150 or another storage medium and exhibits various functions of the controller 110. The controller 110 includes a region detection part 111, a position determination part 112, a compositing part 113, and a display controller 114. Those functional parts of the controller 110 will be described later. Note that some of or all of the region detection part 111, the position determination part 112, and the compositing part 113 may not be contained inside the display control device 100, and may be disposed in a server communicable with the display control device 100 and the like.

The input part 120 has a function of accepting an operation from a user. The input part 120 outputs the operation accepted from the user to the controller 110. The operation may be used for executing a program. Further, for example, the input part 120 can also accept an operation for starting activation of a program from the user. Still further, for example, the input part 120 can also accept an operation for terminating execution of a program from the user. In the example shown in FIG. 2, although the input part 120 is placed inside the display control device 100, the input part 120 may be provided outside the display control device 100.

The imaging part 130 images an imaging range to thereby acquire a captured image, and outputs the captured image to the controller 110. The imaging part 130 performs the imaging with an imaging magnification set in accordance with an operation input to the input part 120. The imaging magnification may be adjusted by using a zoom function, but the zoom function is not particularly limited, and the zoom function may be an optical zoom function or an electronic zoom function. Note that, in the example shown in FIG. 2, although the imaging part 130 is provided in an integrated manner with the display control device 100, the imaging part 130 may also be provided separately from the display control device 100.

The storage 150 stores a program for causing the controller 110 to operate by using a storage medium such as semiconductor memory or a hard disk. Further, for example, the storage 150 can also store various types of data (for example, pieces of setting information and pieces of content) that are used by the program. Note that, in the example shown in FIG. 2, although the storage 150 is provided in an integrated manner with the display control device 100, the storage 150 may also be provided separately from the display control device 100.

The communication part 160 can communicate with another device. The communication scheme of the communication part 160 is not particularly limited, and the communication performed by the communication part 160 may be via radio or wire. Note that, in the example shown in FIG. 2, although the communication part 160 is provided in an integrated manner with the display control device 100, the communication part 160 may also be provided separately from the display control device 100.

The display part 170 displays pieces of information in accordance with control performed by the controller 110. For example, the display part 170 may include a liquid crystal display (LCD) and an organic electroluminescence (EL) display device. Alternatively, the display part 170 may include audio output devices such as a speaker and headphones. Note that, in the example shown in FIG. 2, although the display part 170 is provided in an integrated manner with the display control device 100, the display part 170 may also be provided separately from the display control device 100.

Heretofore, a functional configuration example of the display control device 100 has been described.

<<3. Details of functions of display control device>>

Figure 3:
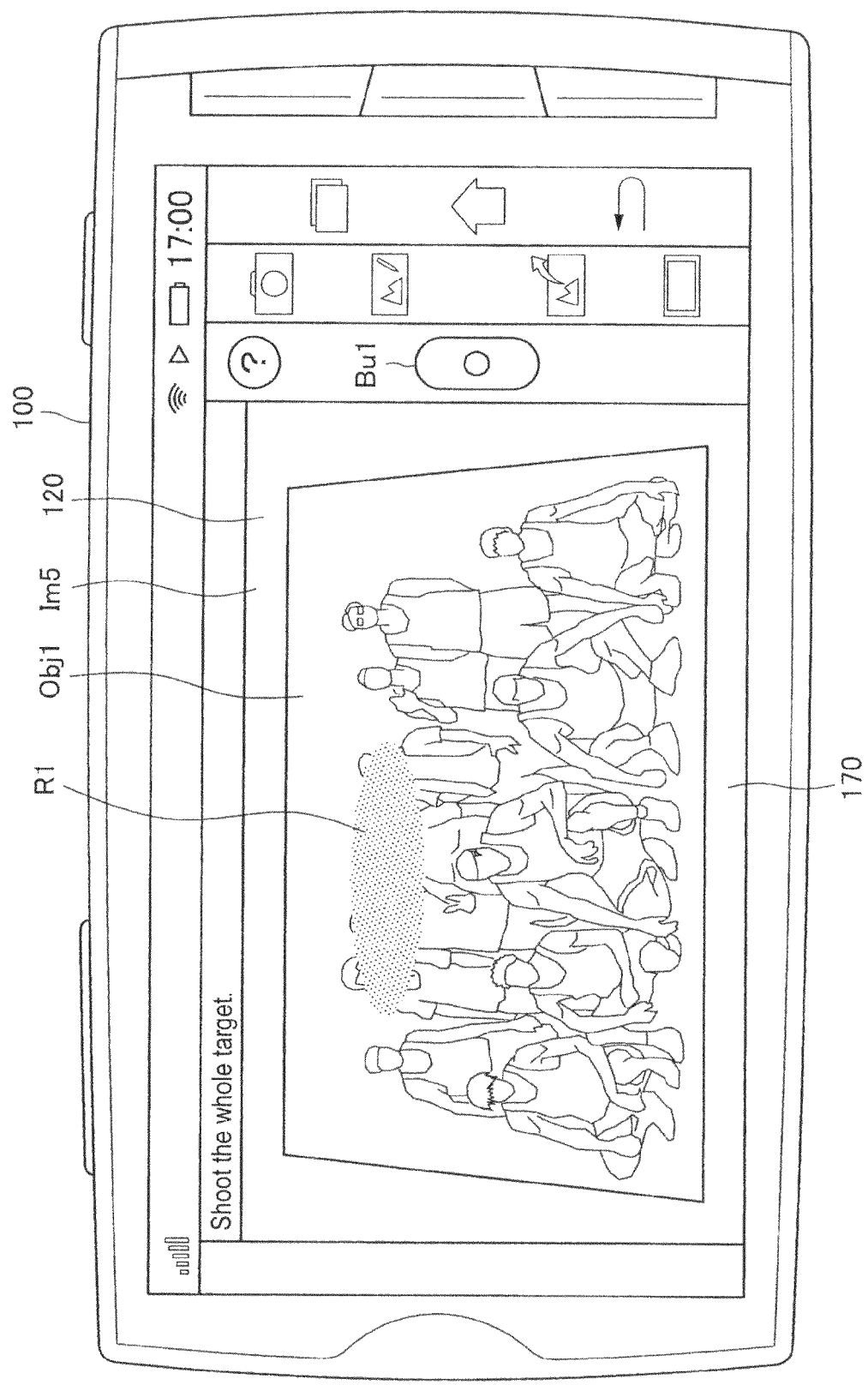
FIG. 3 is a diagram showing a display example of a through image at a time of performing first imaging.

Next, details of functions of the display control device 100 will be described. FIG. 3 is a diagram showing a display example of a through image at a time of performing first imaging. In the description below, as shown in FIG. 3, an example will be described in which the display control device 100 includes the input part 120 and the display part 170. Further, although a case where a touch panel is used as an example of the input part 120 will be described in what follows, the input part 120 is not limited to the touch panel.

When a user attempts to make the imaging part 130 perform first imaging and fits an imaging target Obj1 into an imaging range, a through image Im5 in which the imaging target Obj1 is shown is imaged, and the display controller 114 causes the display part 170 to display the through image Im5. When the user confirms the through image Im5 and presses an imaging button Bu1, the first imaging is performed by the imaging part 130. However, as shown in FIG. 3, there may be a case where the through image Im5 includes a modification target region R1. Here, a region in which light emitted from a fluorescent light is reflected is shown as the modification target region R1.

Figure 4:
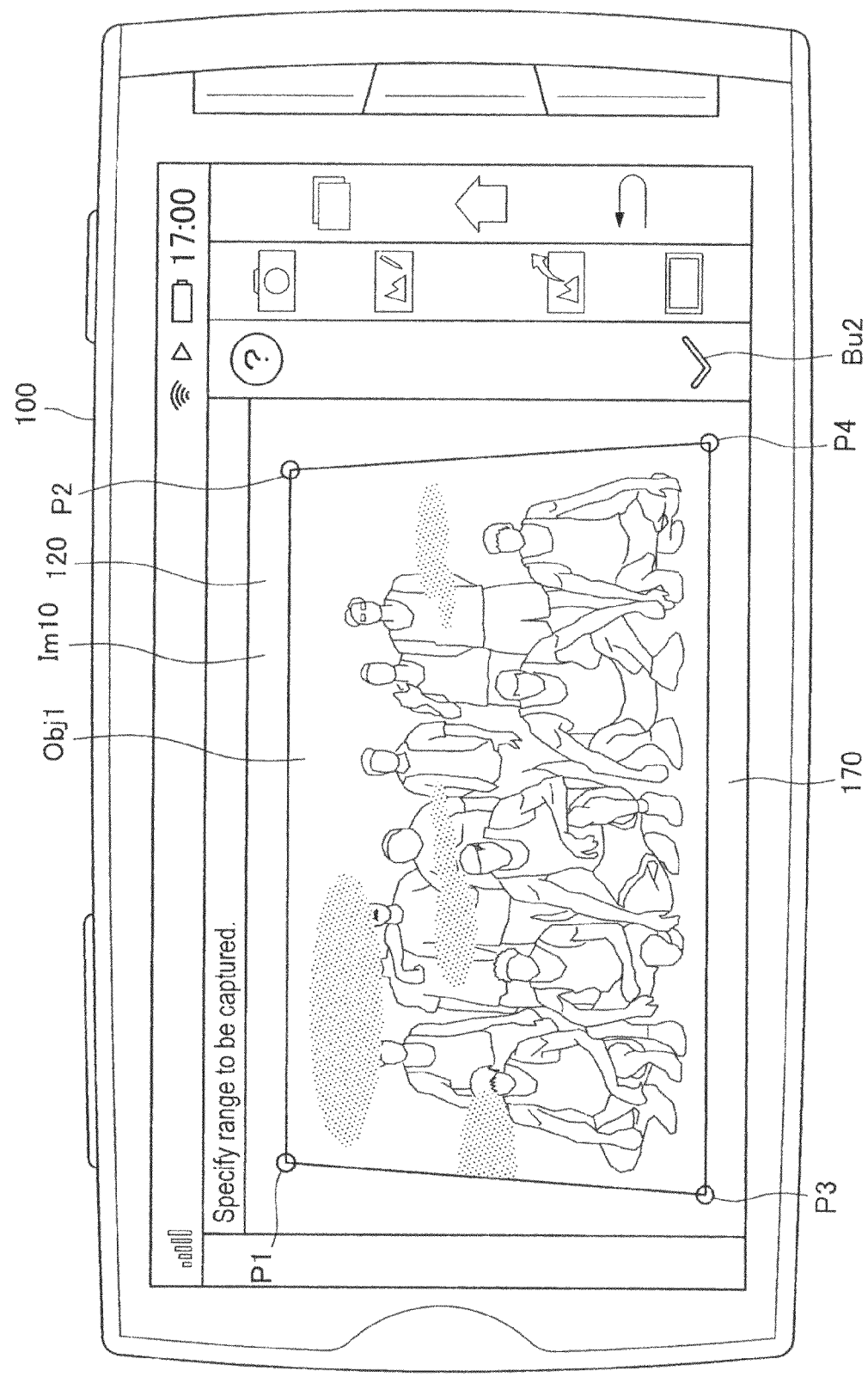
FIG. 4 is a diagram showing a display example of a first captured image.

FIG. 4 is a diagram showing a display example of a first captured image Im10. As shown in FIG. 4, the display controller 114 causes the display part 170 to display the captured image Im10 obtained by the first imaging. As shown in FIG. 4, the display controller 114 may extract a rectangular region from the captured image Im10. In this case, the four corners of the rectangular region are represented by adjustment positions P1 to P4, and, when a movement operation is performed on the adjustment positions P1 to P4 by a user's drag operation, the display controller 114 may adjust the size of the rectangular region in accordance with the movement operation. In the case where multiple rectangular regions are extracted from the captured image Im10, the following operation may be performed for each extracted rectangular region.

When the size changing of the rectangular region is terminated and the user presses an end button Bu2, the display controller 114 performs trapezoid correction on the rectangular region, for example. Further, the display controller 114 may display a correction result. Note that the correction performed on the rectangular region is not limited to the trapezoid correction, and in the case where the imaging target Obj1 is bent, bend correction may be performed. In particular, in the case where the imaging target Obj1 is bound (for example, in the case where the imaging target Obj1 is a book or the like), the bending may easily occur in the imaging target Obj1.

Figure 5:
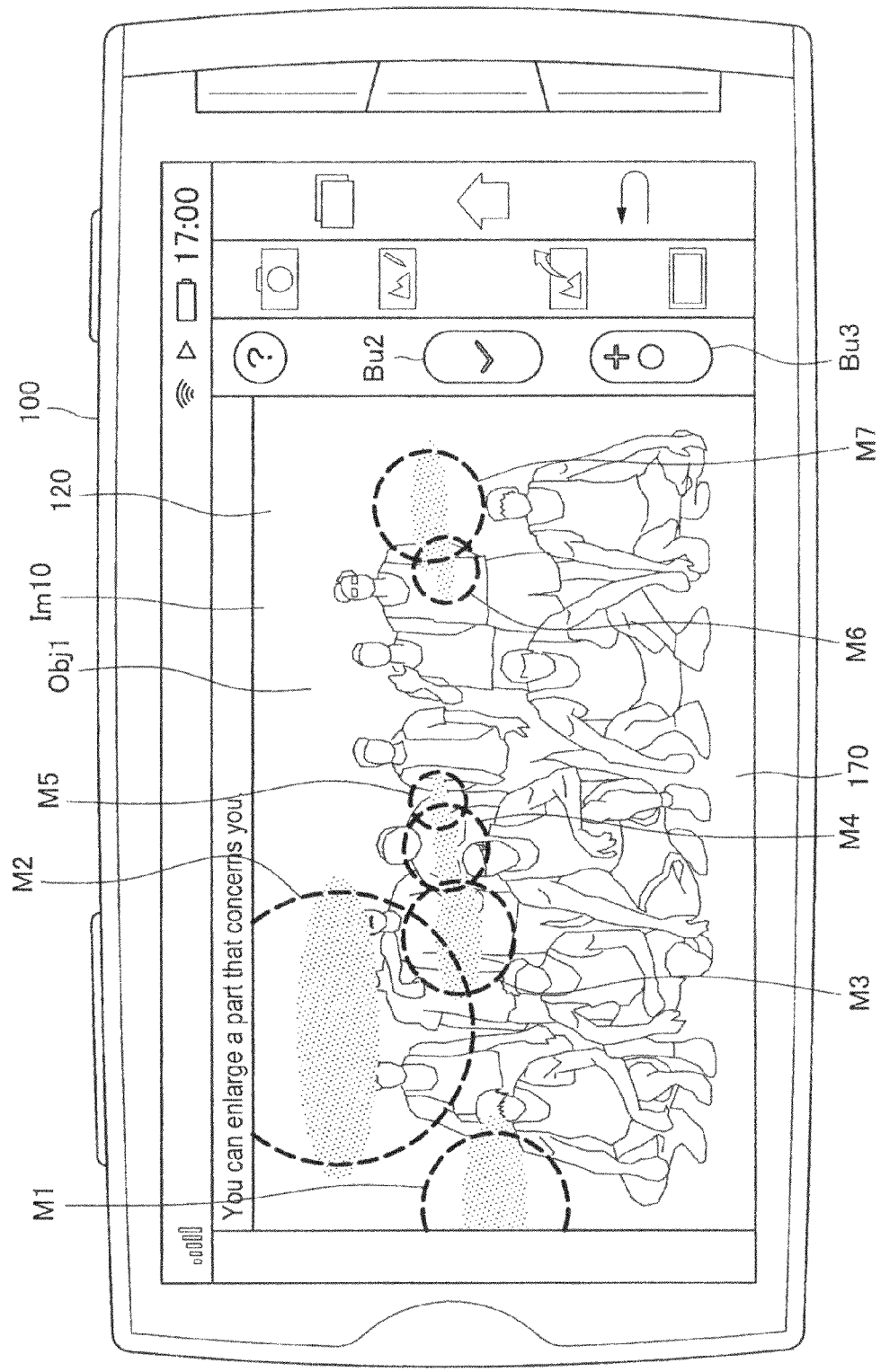
FIG. 5 is a diagram showing a display example of a correction result of a first captured image.

FIG. 5 is a diagram showing a display example of a correction result of a first captured image Im10. Here, the region detection part 111 detects a modification target region from the captured image Im10. The way of detecting the modification target region is not particularly limited. For example, the region detection part 111 may detect the modification target region on the basis of color information of the captured image Im10.

In more detail, the region detection part 111 may detect, as the modification target region, a region in which the color information is in a given range within the captured image Im10. The region detection part 111 may detect, as the modification target region, a region in which whiteness exceeds a threshold. In this manner, the region in which light emitted from a fluorescent light is reflected can be detected as the modification target region.

Further, the region detection part 111 may also detect the modification target region on the basis of the difference of color information between a pixel of the through image and the corresponding pixel of the captured image Im10. In more detail, the region detection part 111 may detect, as the modification target region, a region in which the difference of color information between a pixel of the through image and the corresponding pixel of the captured image Im10 exceeds a threshold. This is because, in the case where the difference between the corresponding pixels exceeds a threshold, it is highly likely that the color of the pixel is different from the color of the imaging target Obj1 itself. The position determination part 112 determines the corresponding positions between the captured image Im10 and the through image Im5 on the basis of the captured image Im10 and the through image Im5.

Alternatively, the region detection part 111 may detect, as the modification target region, a region in which the color information is in a given range in the captured image Im10 and in which the difference of color information between a pixel of the through image and the corresponding pixel of the captured image Im10 exceeds a threshold. With such detection, it is expected that the detection accuracy of the modification target region is further enhanced. For example, the color information may be any of chroma, hue, and brightness. Further, the given range may be determined in advance, or may be changed by learning.

Further, not all the detection of the modification target region is performed automatically. For example, when a user views the captured image Im10 and finds a region that necessitates modification, the region may be specified by a drag operation or the like. In this case, the region detection part 111 may detect the modification target region on the basis of the user's operation.

Next, in the case where the modification target region is detected from the captured image Im10, the display controller 114 changes the display of a given position based on the position of the modification target region. In the example shown in FIG. 5, the display controller 114 causes circles M1 to M7 to be displayed, each having the center of a modification target region as its center and having a radius whose size corresponds to the size of the modification target region. However, a way of changing display is not limited to such example. The modification target region itself may be displayed in a flashing manner, displayed semitransparently, or the color of the modification target region may be changed.

Note that, it is not necessarily true that a user wants to modify all of modification target regions detected by the region detection part 111. Accordingly, the modification target region(s) which the user does not want to modify may be cancelled. For example, the display changing may be cancelled by the user's cancelling operation. The cancelling operation is not particularly limited, and may be an operation of touching a part in which the display changing is performed, for example.

When the user views the captured image Im10 and in the case where the user considers that re-imaging is not necessary, the user may press the end button Bu2. In the case where the end button Bu2 is pressed, the display controller 114 may display a selection screen like the screen shown in FIG. 15. On the other hand, in the case where the user considers that the re-imaging is necessary, the user may press a re-imaging button Bu3. When the re-imaging button Bu3 is pressed, the display controller 114 may display guidance before the re-imaging.

Figure 6:
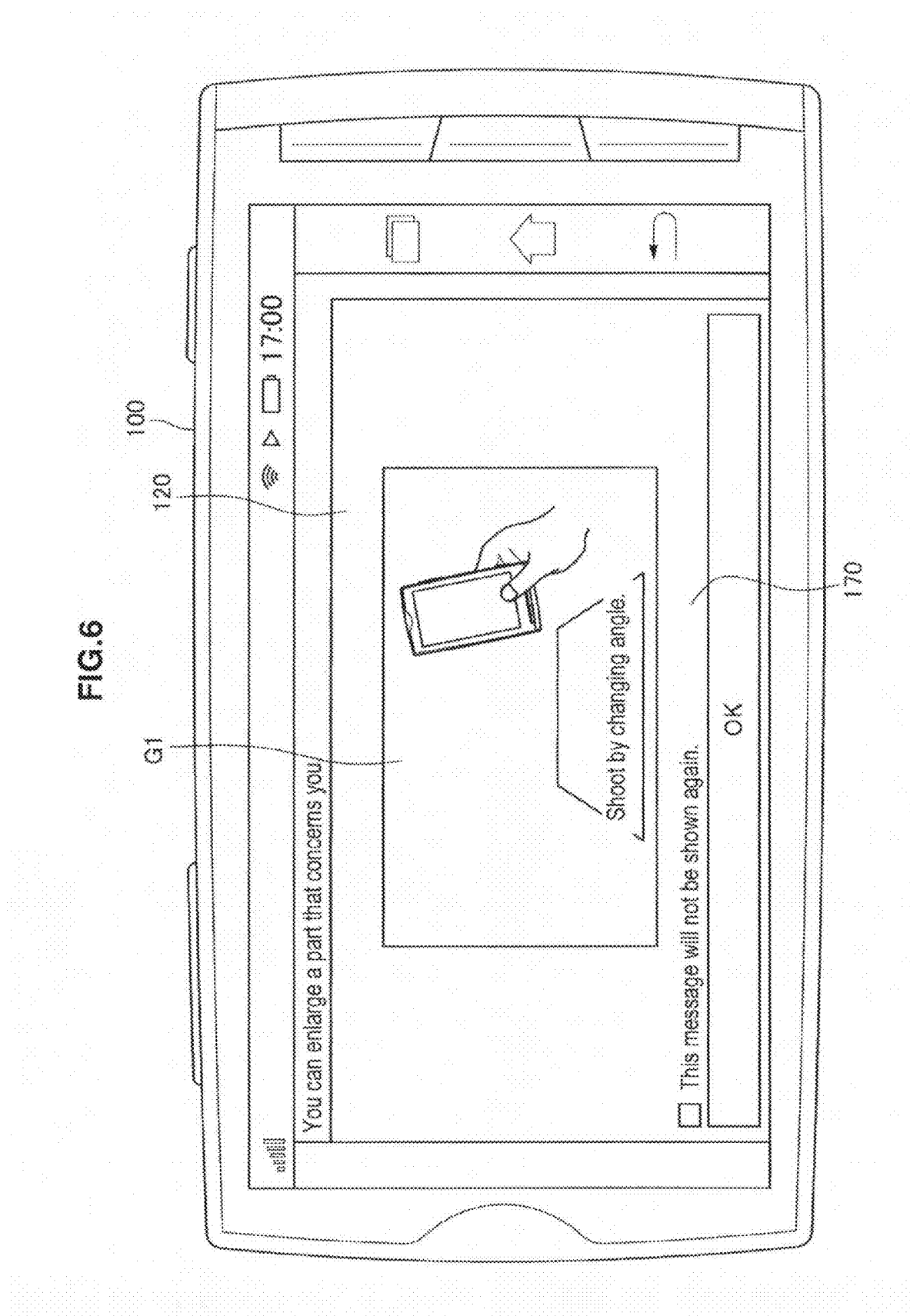
FIG. 6 is a diagram showing a display example of guidance before re-imaging.

FIG. 6 is a diagram showing a display example of guidance G1 before re-imaging. As shown in FIG. 6, the display controller 114 may cause the display part 170 to display an imaging position or the guidance G1 suggesting changing an imaging direction at the time of re-imaging. This is performed because, a region detected as a modification target region in the first captured image Im10 may no longer be detected as the modification target region in a captured image obtained by re-imaging, if re-imaging is performed in a changed imaging direction. The imaging position may be a position of the modification target region detected from the first captured image Im10.

Note that the guidance to be displayed is not limited to "Shoot by changing angle". For example, the guidance is not particularly limited as long as the guidance suggests changing the imaging direction, and may be "Shoot in an angle so as to be free from blown-out highlights", or may be other guidance. For example, when the user presses "OK", the display controller 114 displays a through image at the time of re-imaging.

Figure 7:
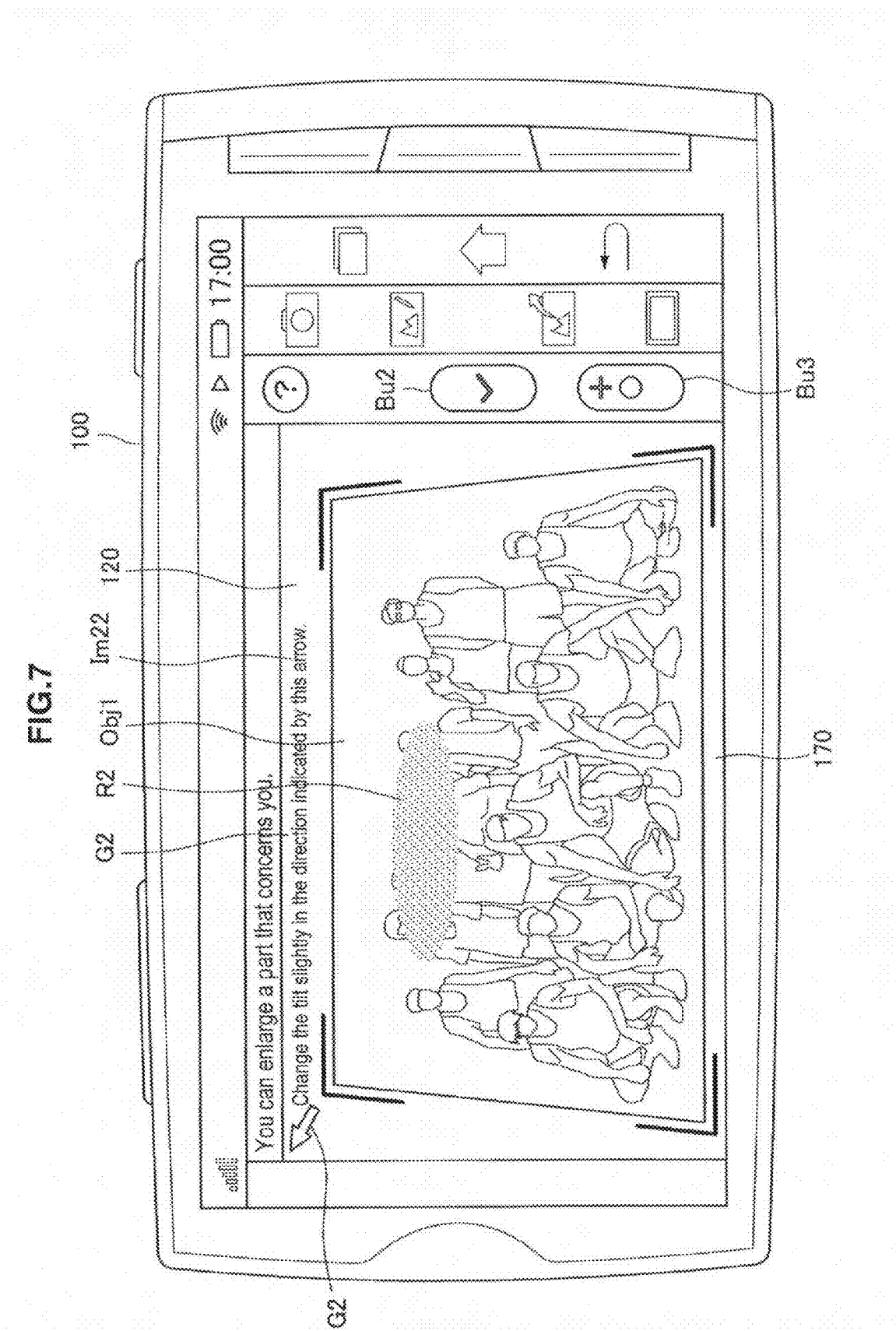
FIG. 7 is a diagram showing a display example of a through image at a time of re-imaging.

FIG. 7 is a diagram showing a display example of a through image Im22 at a time of re-imaging. When the user causes the imaging part 130 to perform re-imaging and fits an imaging target Obj1 into an imaging range, the through image Im22 in which the imaging target Obj1 is shown is imaged, and the display controller 114 causes the display part 170 to display the through image Im22. The through image Im22 includes a modification target region R2.

Here, as shown in FIG. 7, the display controller 114 may cause the display part 170 to display recommendation information indicating a direction that is recommended as a changed imaging direction. Although FIG. 7 shows an example in which the display controller 114 causes the display part 170 to display an arrow and a message as recommendation information G2, the display controller 114 may also cause the display part 170 to display any one of the arrow and the message. Further, the recommendation information G2 may be determined in any way.

For example, the display controller 114 may determine the recommendation information G2 in accordance with the position of the modification target region R1 detected from the first captured image Im10. In more detail, the display controller 114 may determine the recommendation information G2 in accordance with a direction toward the position at which the modification target region R1 exists based on the center of the first captured image Im10. This is because, if the imaging direction is changed to such a direction, it is expected that the modification target region R2 may disappear from the captured image Im22. Alternatively, in the case where the display controller 114 can estimate a position of a light source, the display controller 114 may also determine the recommendation information G2 in accordance with the estimated position of the light source.

Figure 15:
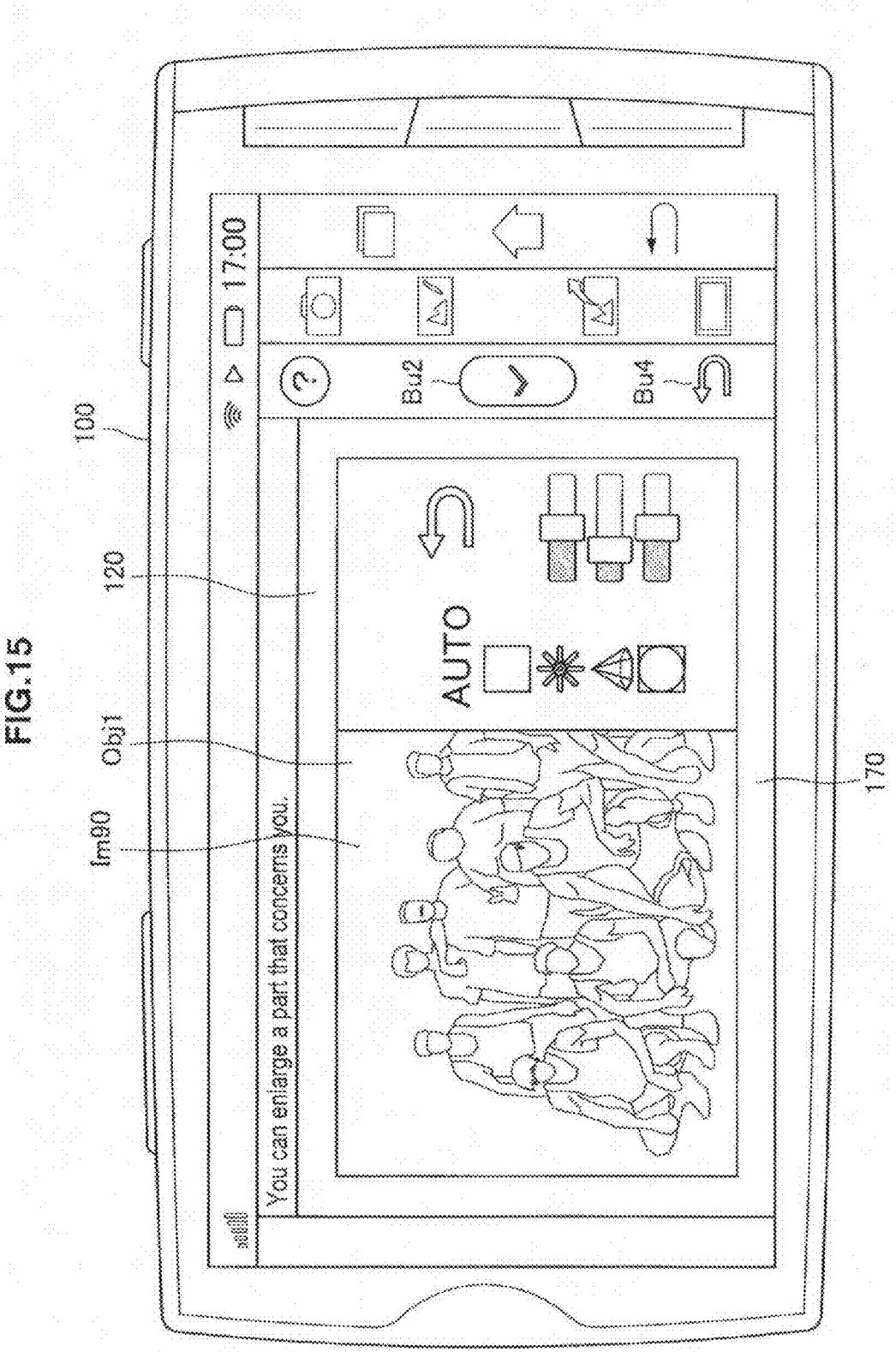
FIG. 15 is a diagram showing a display example of a selection screen for filter processing to be performed on a composite image.

Here, in the case where the user presses the end button Bu2, the display controller 114 may display a selection screen like the screen shown in FIG. 15, for example. On the other hand, in the case where the user confirms the through image Im22 and presses the re-imaging button Bu3, the imaging part 130 performs re-imaging. As a result, the display control device 100 can acquire a captured image obtained by re-imaging. On the captured image obtained by re-imaging, a projective transformation may be performed so that the captured image obtained by re-imaging has the same tilt as the first captured image, for example.

Next, the compositing part 113 composites a part or all of the captured image obtained by re-imaging on the modification target region R1 detected from the first captured image Im10. For example, the compositing part 113 may extract a region corresponding to the modification target region R1 from the captured image obtained by re-imaging and may composite the extracted region on the modification target region R1. Note that the compositing part 113 may composite, on the modification target region R1, a region corresponding to the modification target region R1 extracted from the captured image obtained by re-imaging, as necessary. For example, in the case where a modification target region detected from the region corresponding to the modification target region R1 extracted from the captured image obtained by re-imaging is smaller than the modification target region R1 detected from the first captured image Im10, the compositing part 113 may composite the region corresponding to the modification target region R1 extracted from the captured image obtained by re-imaging on the modification target region R1.

Here, the corresponding position between the first captured image Im10 and the captured image obtained by re-imaging may be determined by the position determination part 112 on the basis of the first captured image Im10 and the captured image obtained by re-imaging. The way of adjusting a position performed by the position determination part 112 is not particularly limited. After that, the display controller 114 may cause the display part 170 to display a composite image Im90.

Figure 8:
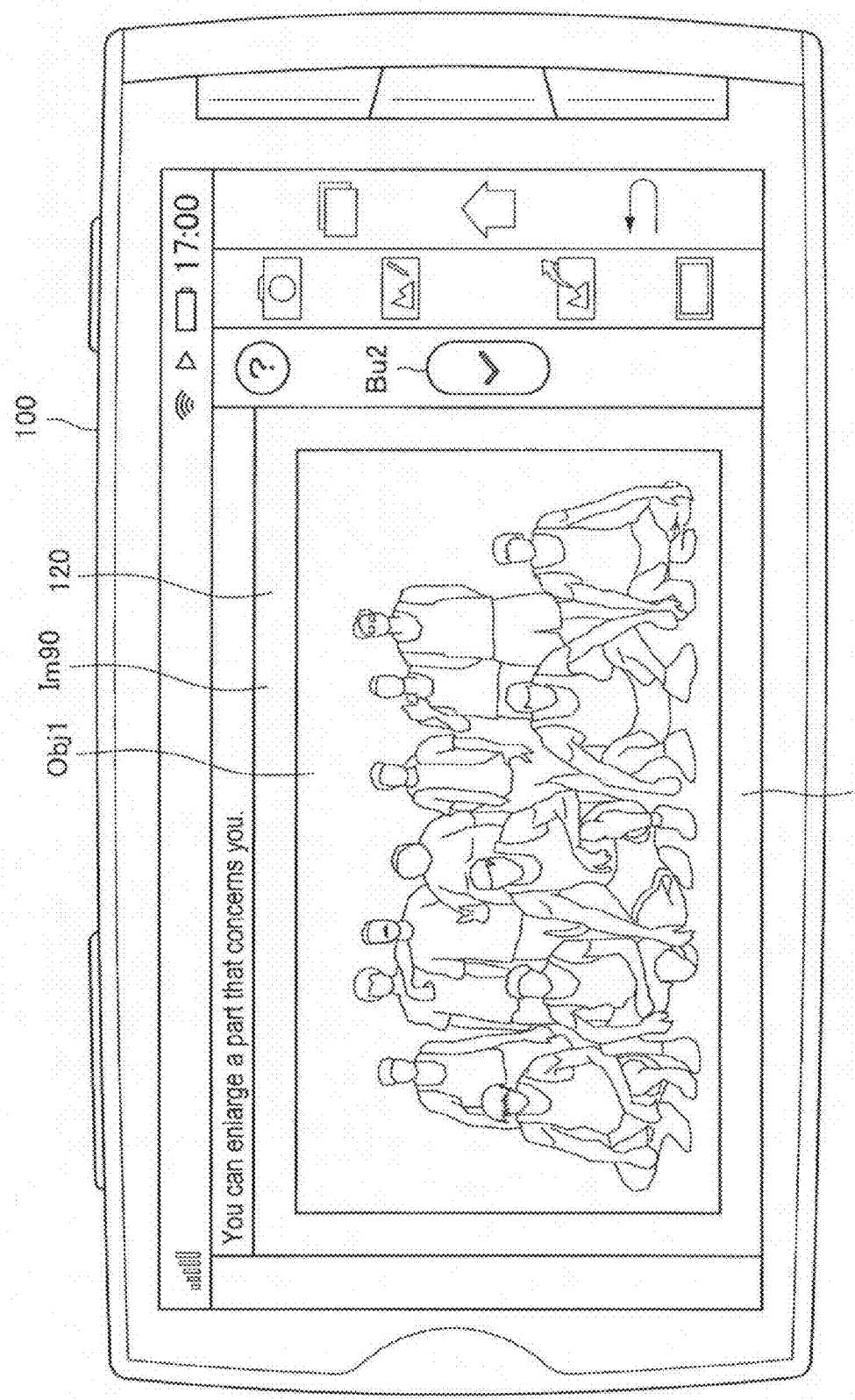
FIG. 8 is a diagram showing a display example of a composite image.

FIG. 8 is a diagram showing a display example of a composite image Im90. As shown in FIG. 8, the display controller 114 is capable of causing the display part 170 to display the composite image Im90 obtained by the compositing performed by the compositing part 113. Here, when the modification target region is reduced in the region corresponding to the modification target region R1 in the captured image obtained by re-imaging, compared with the modification target region R1 in the first captured image Im10, the composite image Im90 in which the modification target region is reduced can be obtained.

Here, in the case where the user presses the end button Bu2, the display controller 114 may display a selection screen like the screen shown in FIG. 15, for example. Note that, although the modification target region is not detected from the composite image Im90 shown in FIG. 8, in the case where the modification target region is detected from the composite image Im90, the display controller 114 may perform again the display before the re-imaging in which the composite image Im90 is displayed instead of the first captured image Im10 (see FIG. 5). Then, the compositing part 113 may composite a third captured image on the composite image Im90, to thereby generate a new composite image.

In this manner, an operation of compositing the latest captured image on a previous composite image may be repeated. Further, in the case where the modification target region is detected from the composite image on the basis of an operation performed by the user, the display controller 114 may perform again the display before the re-imaging. Further, in the case where a region is specified by the user in the composite image Im90, the compositing part 113 may extract the region corresponding to the specified region from the captured image obtained by re-imaging and may composite the extracted region on the composite image Im90.

Further, in the case where the user who has viewed the composite image Im90 wants to return to the display before the compositing, it may be possible to perform a cancelling operation. In the case where the cancelling operation is performed by the user, the compositing part 113 cancels the latest compositing, and the display controller 114 may perform again the display before the re-imaging.

Figure 9:
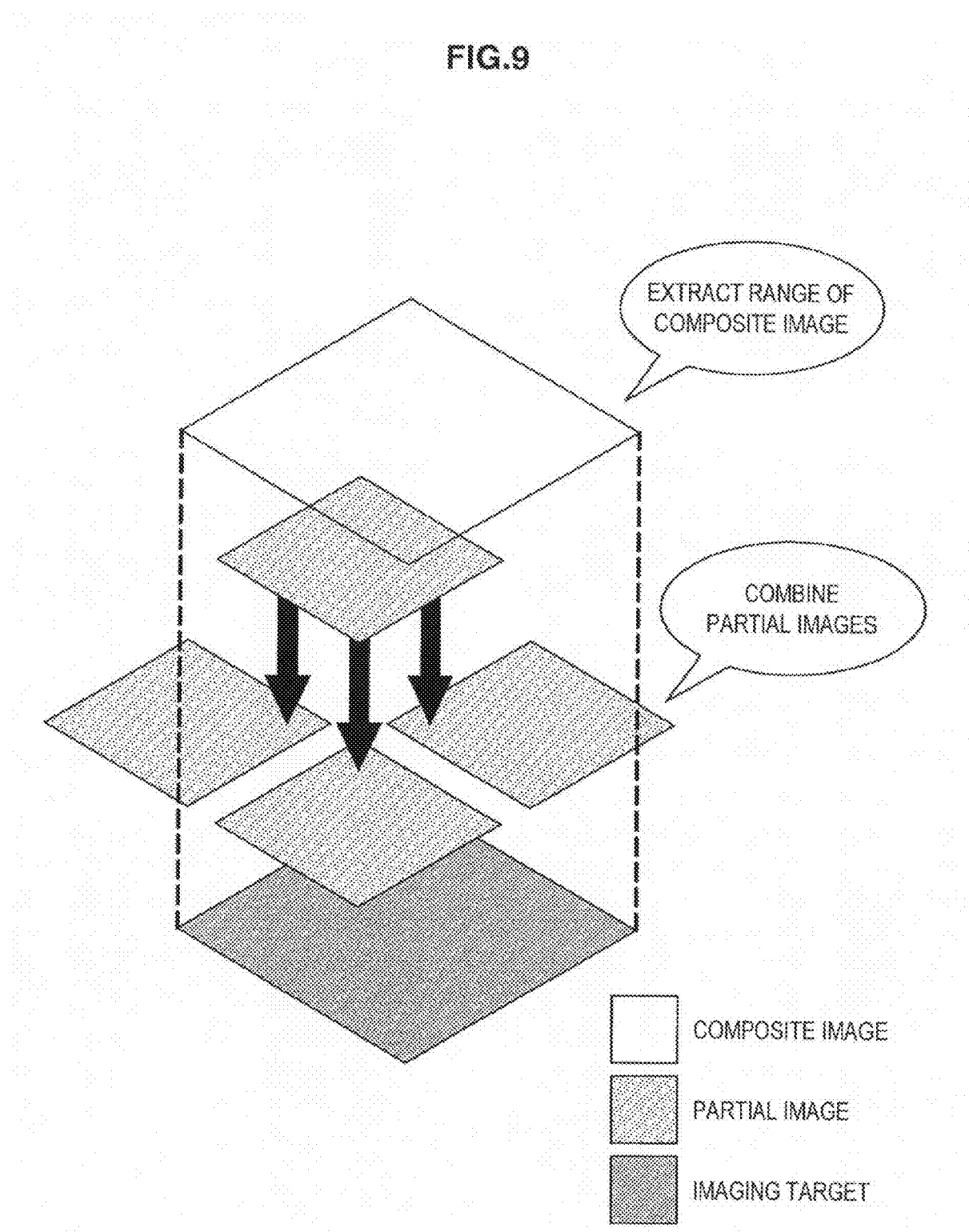
FIG. 9 is a diagram illustrating a composite example of combining partial images.
Figure 10:
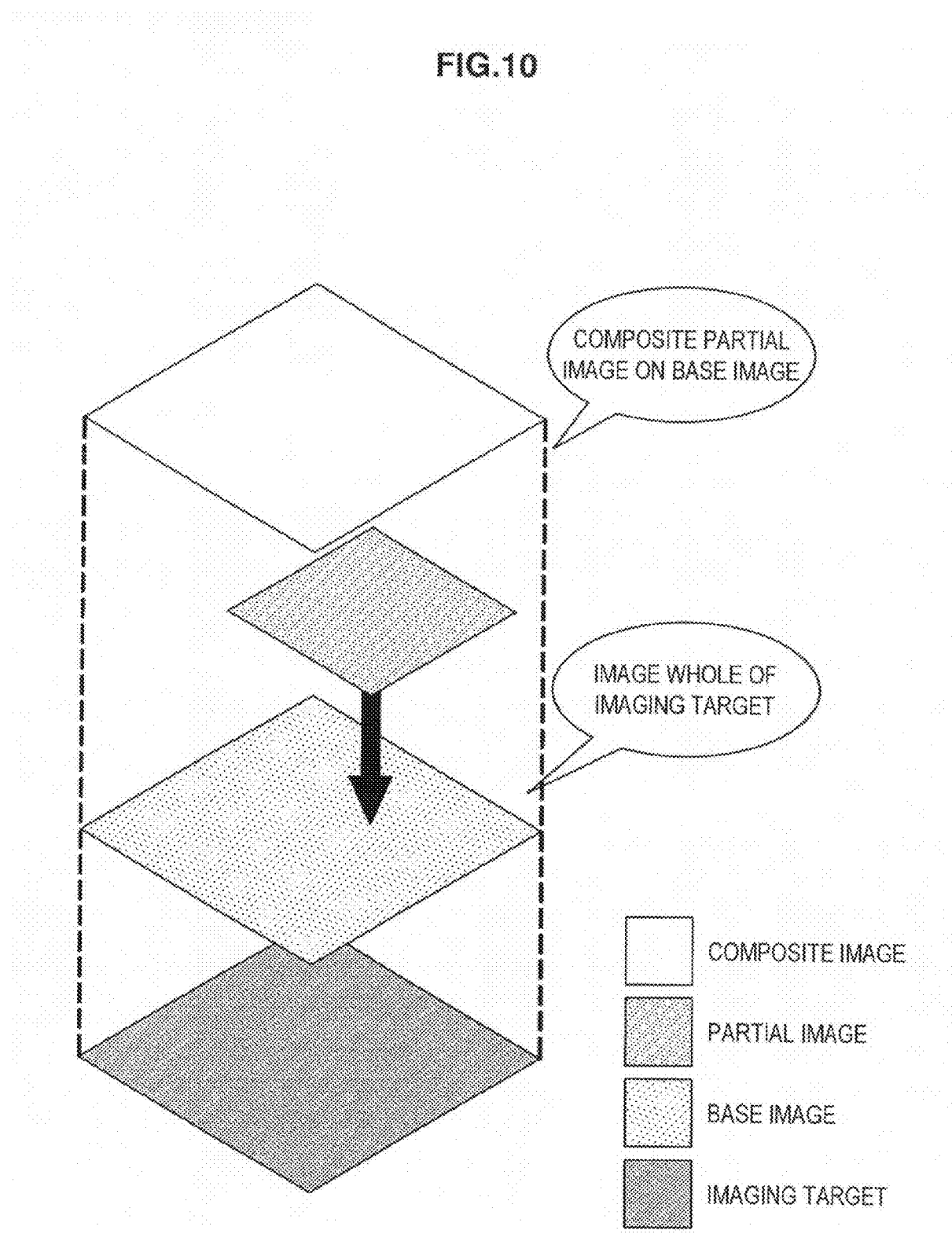
FIG. 10 is a diagram illustrating a composite example of superimposing a partial image on a base image.

Here, with reference to FIG. 9 and FIG. 10, compositing performed by the compositing part 113 will be described in more detail. There are many ways of performing compositing by the compositing part 113, and any one of the ways may be employed. FIG. 9 is a diagram illustrating a composite example of combining partial images. As shown in FIG. 9, for example, the compositing part 113 may generate a composite image by combining partial images in which the imaging target Obj1 is imaged, and then extracting a range of the composite image.

The way of combining partial images in this manner may be effectively employed in the case where the size of the imaging target Obj1 is larger than the size of the imaging range, for example. Note that the images to be combined may not be partial images and may be whole images. Further, FIG. 10 is a diagram illustrating a composite example of superimposing a partial image on a base image. As shown in FIG. 10, for example, the compositing part 113 may generate a composite image by superimposing a partial image on a base image in which the whole imaging target Obj1 is imaged. Note that the image to be superimposed on the base image may not be a partial image and may be a whole image.

Figure 11:
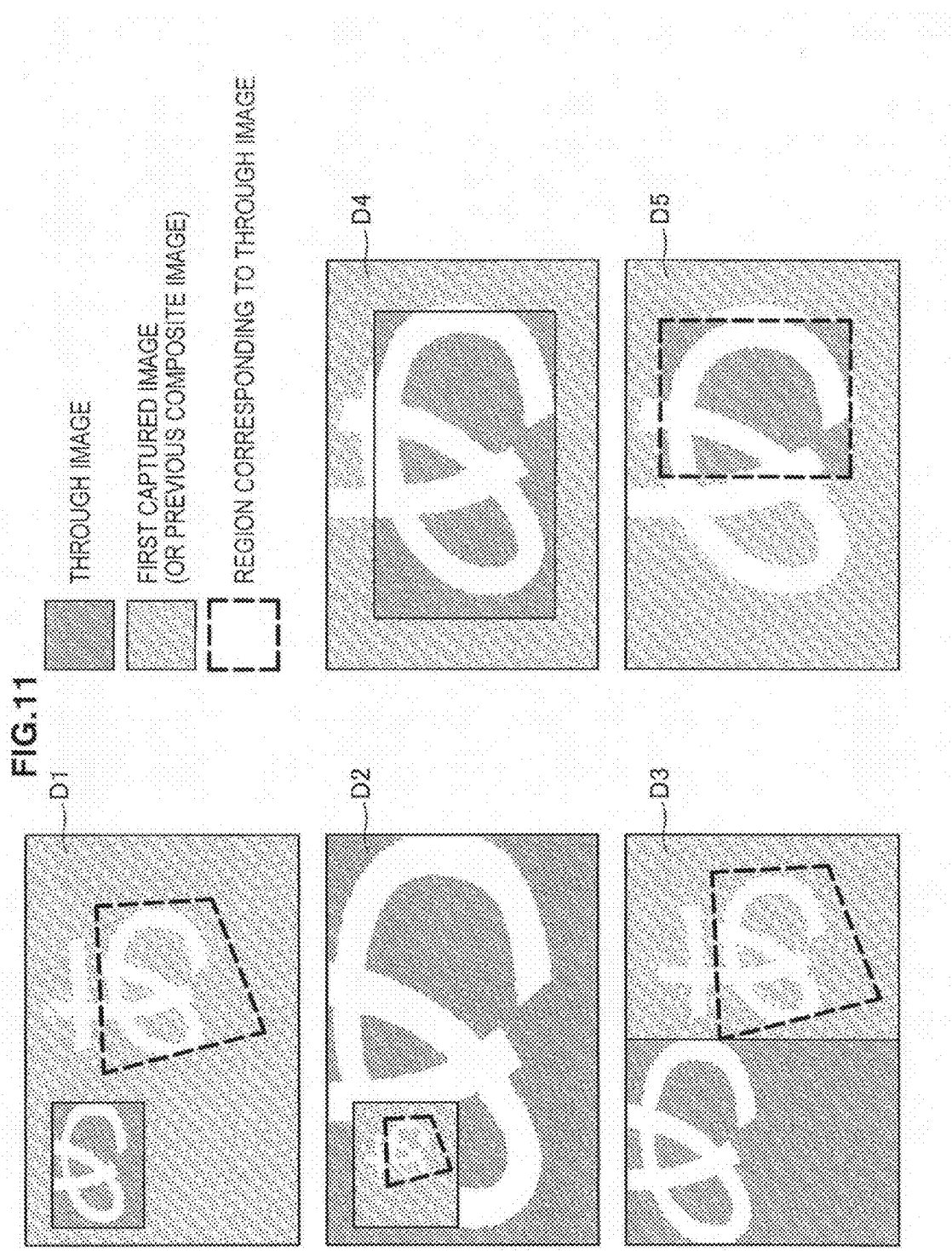
FIG. 11 is a diagram showing display examples of a through image and a first captured image at a time of re-imaging.

In addition, with reference to FIGS. 11 to 14, display examples of captured images will be described in more detail. There are many ways of displaying the captured image by the display controller 114, and any one of the ways may be employed. FIG. 11 is a diagram showing display examples of a through image and a first captured image at a time of re-imaging. The display controller 114 may cause the display part 170 to display at the time of re-imaging the first captured image and the through image as shown in screens D1 to D5 of FIG. 11.

Note that, although the case is mainly described here where the latest imaging is the second imaging and where the first captured image and the through image are displayed, in the case where the number of times of the latest imaging is three or more, a previous composite image and a through image may be displayed as shown in FIG. 11. The display controller 114 may change the display of a given position based on a region corresponding to a through image in the first captured image. For example, in the screens D1 to D3 of FIG. 11, the display controller 114 causes a dashed line to be displayed on the outline of the region corresponding to the through image in the first captured image.

Figure 12:
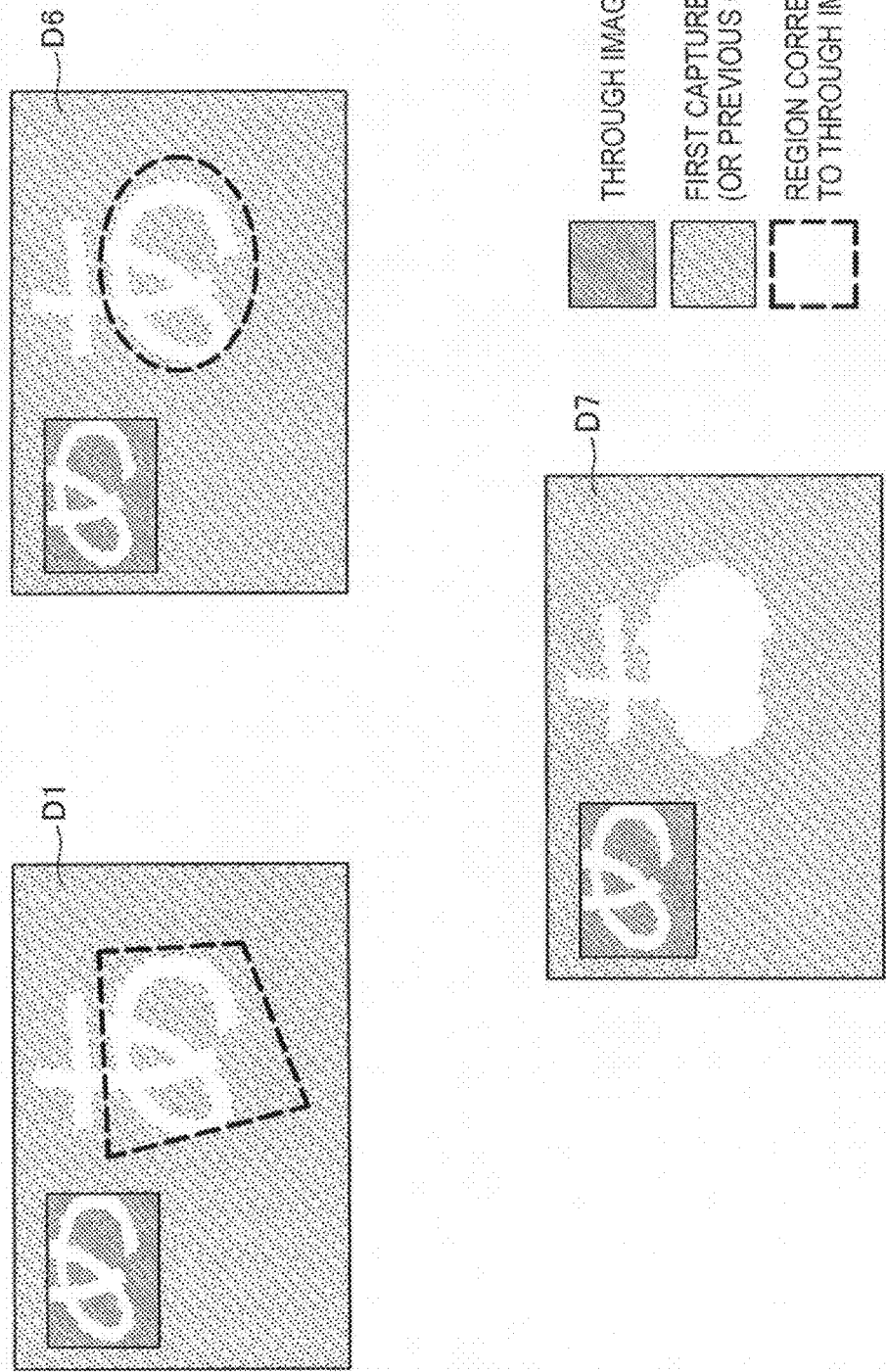
FIG. 12 is a diagram showing examples of changing a display of a given position based on a region corresponding to a through image in a first captured image.

FIG. 12 is a diagram showing examples of changing a display of a given position based on a region corresponding to a through image in a first captured image. In a screen D6, the display controller 114 causes a dashed line to be displayed on an ellipse having the center of the region corresponding to the through image in the first captured image as its center. Further, in a screen D7, the display controller 114 performs a display such that the definition in the vicinity of the region corresponding to the through image in the first captured image is decreased. With the decrease in the definition, the boundary between the through image and the first captured image can be made blurred.

Returning to FIG. 11, and the description will be continued. In the screen D1, the display size of first captured image is larger than the display size of the through image. Accordingly, for example, the screen D1 may be displayed in the case where there is an attempt to easily confirm the position of the through image in the first captured image. On the other hand, in the screen D2, the display size of the first captured image is smaller than the display size of the through image. Accordingly, for example, the screen D2 may be displayed in the case where there is an attempt to easily confirm contents of the through image.

In the screen D3, the display size of the first captured image is the same as the display size of the through image. Accordingly, for example, the screen D3 may be displayed in the case where a terminal having a relatively large-sized screen, such as a tablet terminal, is used.

The screen D4 is an example of a screen in which the frame of the through image is fixed and the display of the first captured image is changed in accordance with the display of the through image. For example, in the case where a terminal having a relatively small-sized screen, the screen D4 may be displayed. Further, the screen D5 is an example of a screen in which the frame of the first captured image is fixed and contents of the through image is changed in accordance with the contents of the first captured image.

Note that, although FIG. 11 shows examples in which the display controller 114 causes the first captured image and the through image to be displayed, the compositing part 113 may dynamically composite the first captured image and the through image, and the display controller 114 may cause the composite image instead of the through image to be dynamically displayed. By dynamically displaying the composite image in this manner, the user can grasp the composited result more promptly.

Figure 13:
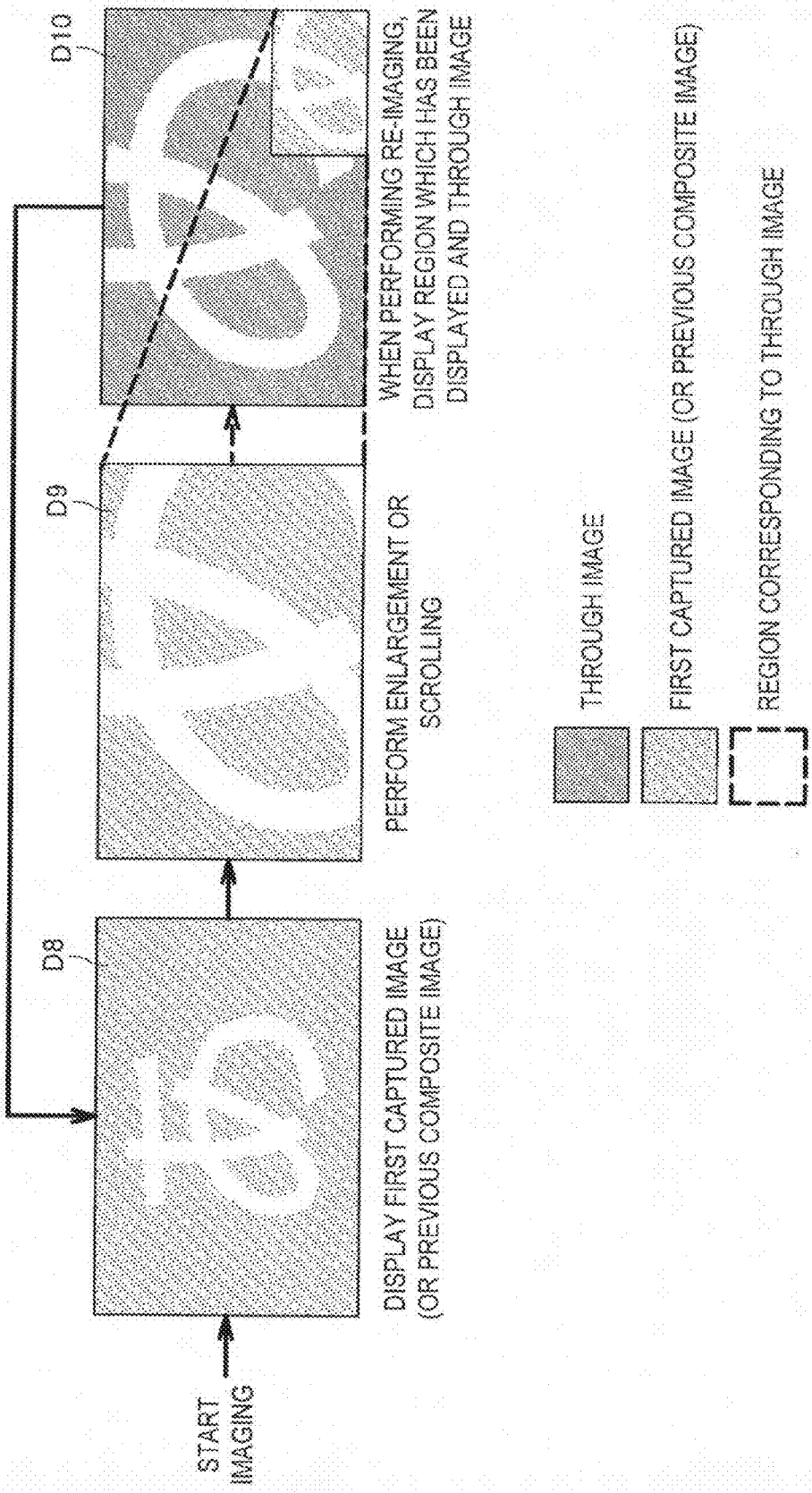
FIG. 13 is a diagram showing a first example displaying alternately a through image and a composite image.

Next, with reference to FIG. 13 and FIG. 14, cases will be described where a through image and a composite image are displayed alternately. FIG. 13 is a diagram showing a first example displaying alternately a through image and a composite image. As shown in a screen D8, after the first imaging, the display controller 114 may cause the first captured image to be displayed. Then, as shown in a screen D9, the display controller 114 may enlarge or scroll the first captured image in accordance with a user's operation.

When a re-imaging button is selected by the user, as shown in a screen D10, the display controller 114 may cause the region which has been displayed and the through image to be displayed. When the imaging part 130 performs re-imaging, the compositing part 113 composites the first captured image and the captured image obtained by re-imaging and generates a composite image, and, as shown in the screen D8, the display controller 114 may cause the display part 170 to display the composite image. The imaging and the compositing after the third time may be repeated in the same manner as the imaging and the compositing of the second time.

Figure 14:
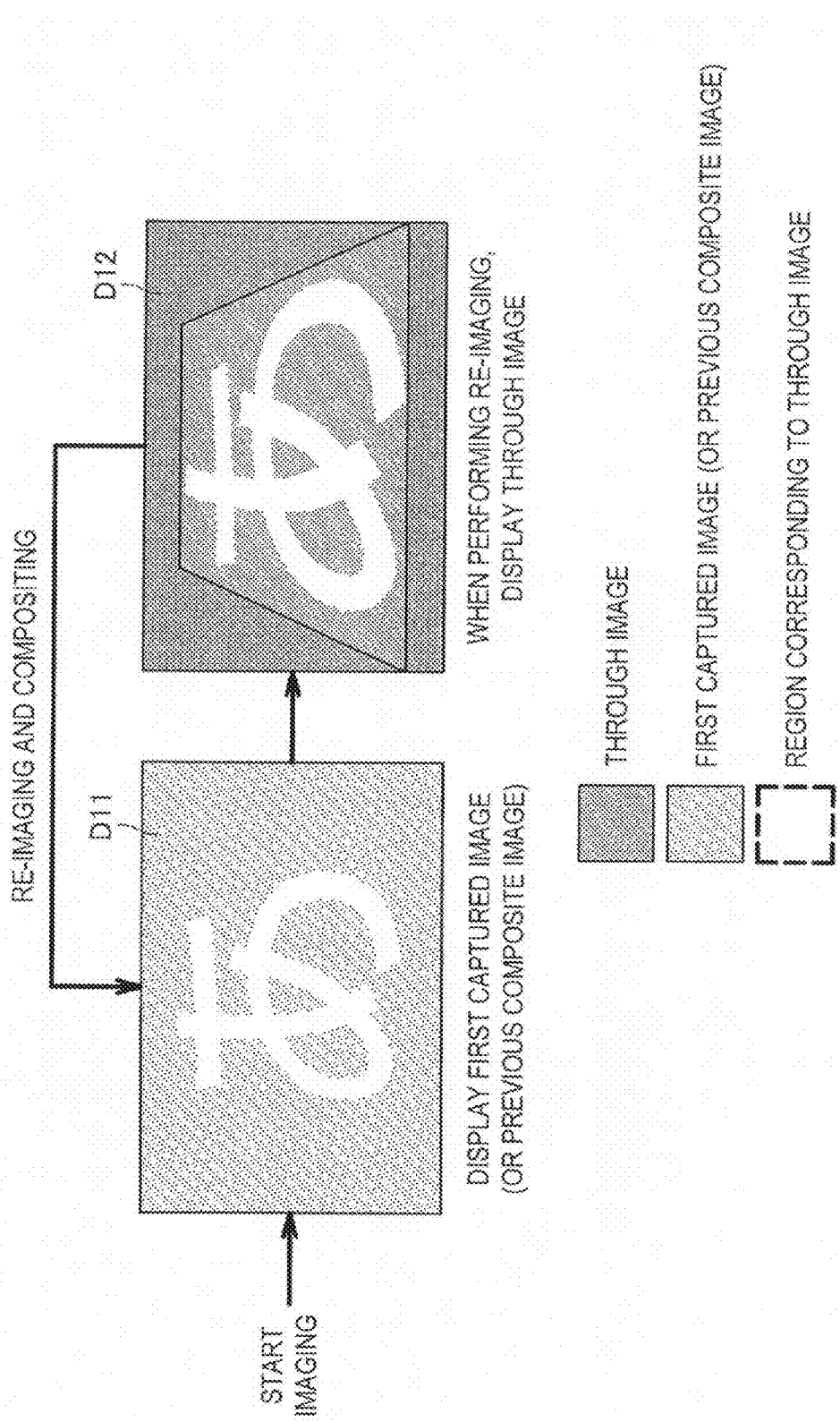
FIG. 14 is a diagram showing a second example displaying alternately a through image and a composite image.

FIG. 14 is a diagram showing a second example displaying alternately a through image and a composite image. As shown in a screen D11, after the first imaging, the display controller 114 may cause the first captured image to be displayed. Then, when a re-imaging button is selected by the user, as shown in a screen D12, the display controller 114 may cause the through image to be displayed. When the imaging part 130 performs re-imaging, the compositing part 113 composites the first captured image and the captured image obtained by re-imaging and generates a composite image, and, as shown in the screen D11, the display controller 114 may cause the display part 170 to display the composite image. The imaging and the compositing after the third time may be repeated in the same manner as the imaging and the compositing of the second time.

FIG. 15 is a diagram showing a display example of a selection screen for filter processing to be performed on a composite image. The filter processing may be performed on the composite image. For example, the filter processing to be performed on the composite image may be filter processing selected by the user using the selection screen shown in FIG. 15. For example, the filter processing may be adjustment of chroma of the composite image, adjustment of hue of the composite image, or may be adjustment of brightness of the composite image. When a cancel button Bu4 is pressed, filter processing that has been once performed on the composite image may be cancelled.

The purpose of use of the thus obtained composite image is not limited. For example, when the end button Bu2 is pressed, the display control device 100 may cause the composite image to be shared with another user. Further, in the case where the sharing of the composite image is terminated, the display control device 100 may cause the user to view the composite image by a viewer function.

Heretofore, details of functions of the display control device 100 have been described.

<<4. Operation example of display control device>>

Figure 16:
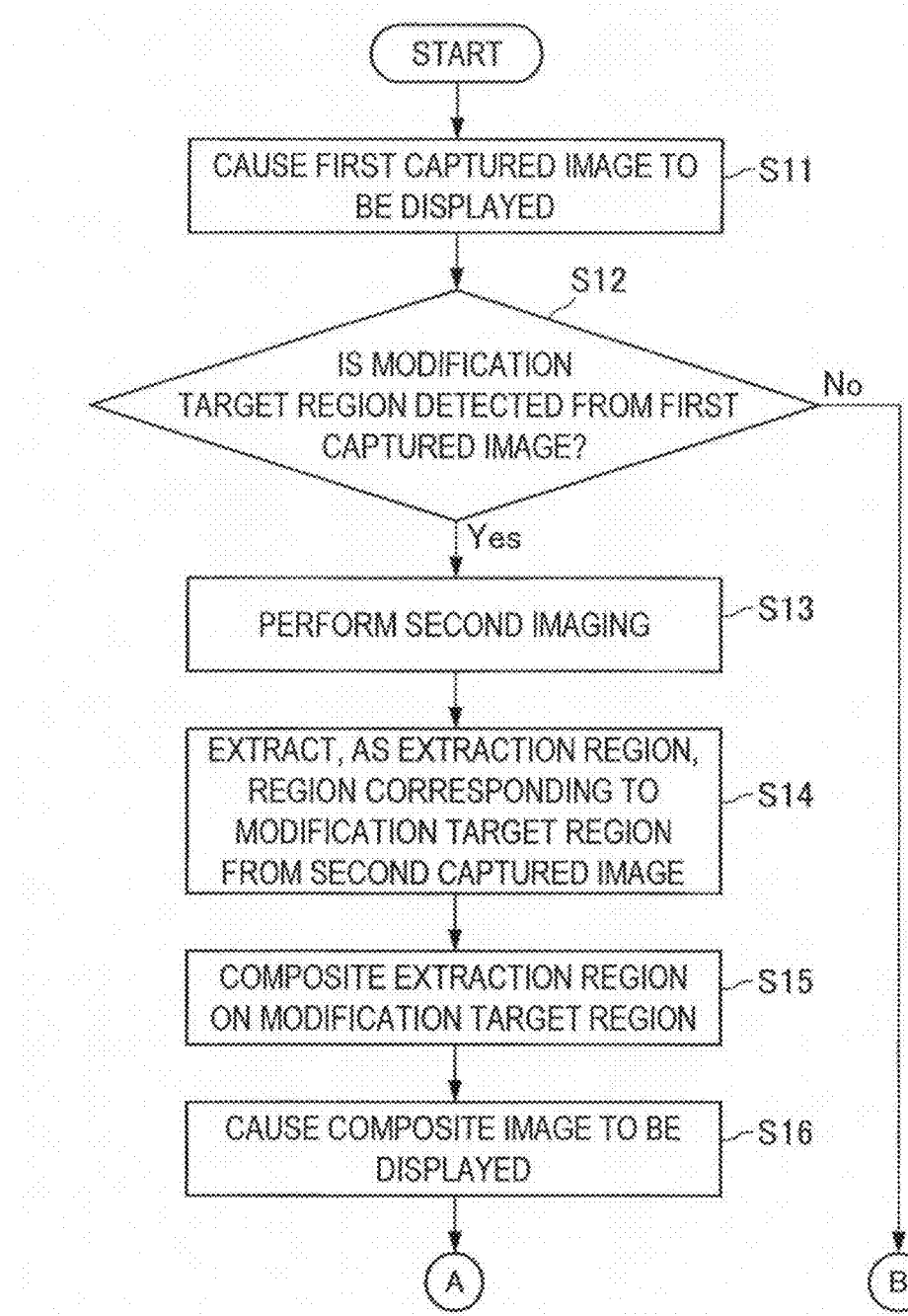
FIG. 16 is a flowchart (part 1) showing an operation example of a display control device.
Figure 17:
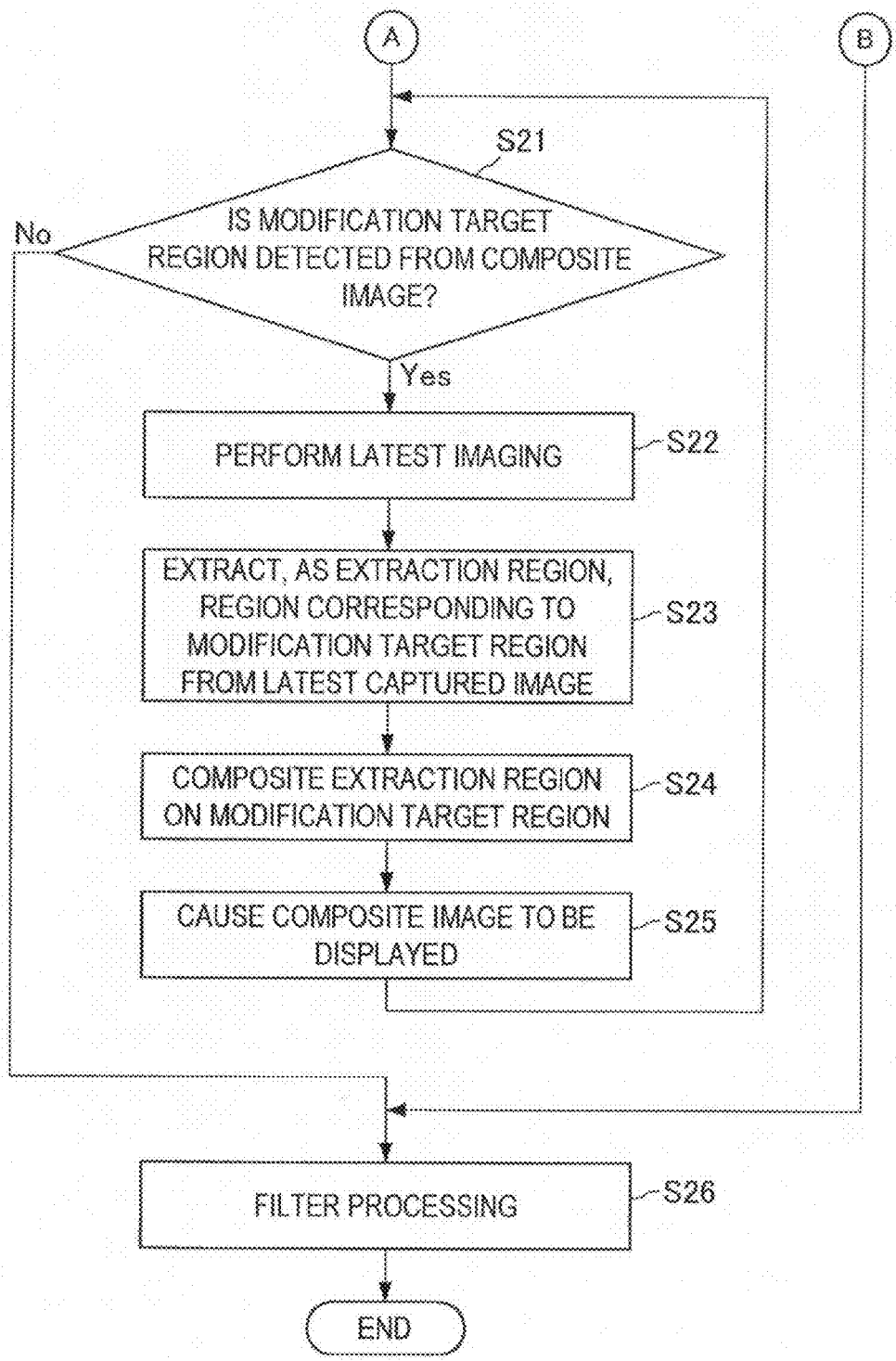
FIG. 17 is a flowchart (part 2) showing the operation example of the display control device.

Next, an operation example of the display control device 100 will be described. FIG. 16 and FIG. 17 are each a flowchart showing an operation example of a display control device. Note that the operation examples shown in FIG. 16 and FIG. 17 are merely examples of operations of the display control device 100. Accordingly, the operation of the display control device 100 is not limited to the examples shown in FIG. 16 and FIG. 17.

First, as shown in FIG. 16, the display controller 114 causes the display part 170 to display a first captured image (S11). Subsequently, in the case where the region detection part 111 does not detect a modification target region from the first captured image ("No" in S12), the operation proceeds to S26. On the other hand, in the case where the region detection part 111 detects the modification target region from the first captured image ("Yes" in S12), the imaging part 130 performs the second imaging (S13), and the region detection part 111 extracts, as an extraction region, a region corresponding to the modification target region from the second captured image (S14). Next, the compositing part 113 composites the extraction region on the modification target region included in the first captured image (S15), and the display controller 114 causes the display part 170 to display the composite image (S16).

Next, in the case where the region detection part 111 does not detect a modification target region from the composite image ("No" in S21), the operation proceeds to S26. On the other hand, in the case where the region detection part 111 detects a modification target region from the composite image ("Yes" in S21), the imaging part 130 performs the latest imaging (S22), and the region detection part 111 extracts, as an extraction region, a region corresponding to the modification target region from the latest captured image (S23). Next, the compositing part 113 composites the extraction region on the modification target region included in the composite image (S24), and the display controller 114 causes the display part 170 to display the composite image (S25).

Next, in the case where the region detection part 111 detects the modification target region from the composite image ("Yes" in S21), the operation proceeds to S22, but in the case where the region detection part 111 does not detect the modification target region from the composite image ("No" in S21), the operation proceeds to S26. In S26, filter processing is performed on the first captured image or the composite image (S26), and the operation of the display control device 100 is terminated.

Note that, although in the present operation examples the re-imaging and the compositing are repeated until the modification target region is not detected any more, the timing at which the re-imaging and the compositing are terminated is not particularly limited. Further, although in the present operation examples the operation of the display control device 100 is terminated after the filter processing is performed on the first captured image or the composite image, the display control device 100 may cause the composite image to be shared with another user, or may cause the user to view the composite image by a viewer function.

<<5. Hardware configuration example>>

Figure 18:
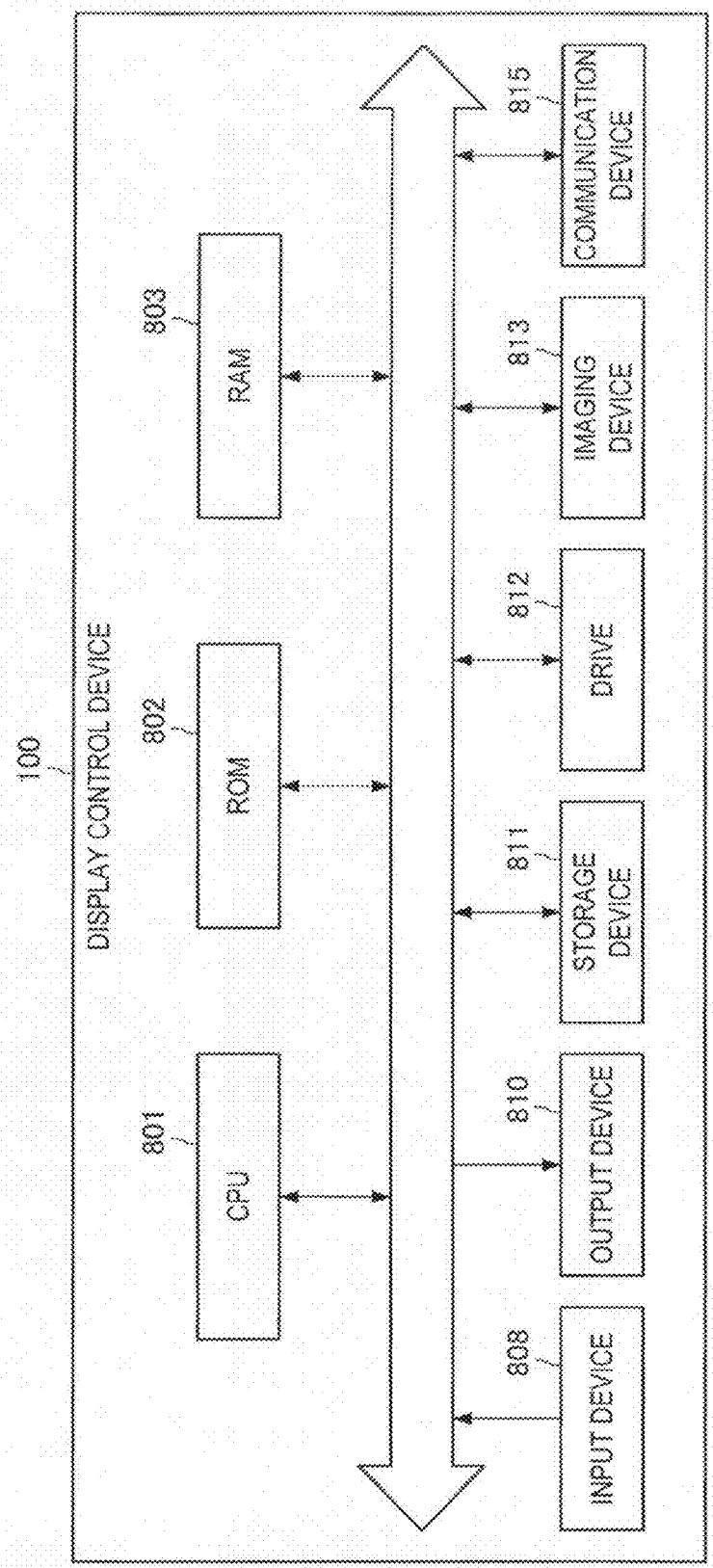
FIG. 18 is a diagram showing a hardware configuration example of a display control device.

Next, a hardware configuration example of the display control device 100 will be described. FIG. 18 is a diagram showing a hardware configuration example of the display control device 100. However, the hardware configuration example shown in FIG. 18 is merely an example of the hardware configuration of the display control device 100. Accordingly, the hardware configuration of the display control device 100 is not limited to the example shown in FIG. 18.

As shown in FIG. 18, the display control device 100 includes a central processing unit (CPU) 801, read only memory (ROM) 802, random access memory (RAM) 803, an input device 808, an output device 810, a storage device 811, a drive 812, an imaging device 813, and a communication device 815.

The CPU 801 functions as an arithmetic processing unit and a control unit, and controls entire operation of the display control device 100 in accordance with various programs. Further, the CPU 801 may be a microprocessor. The ROM 802 stores a program, a calculation parameter, and the like used by the CPU 801. The RAM 803 temporarily stores a program used in execution of the CPU 801, a parameter varying as appropriate during the execution, and the like. They are connected with each other via a host bus configured from a CPU bus or the like.

The input device 808 is configured from, for example, an input part for inputting information by a user, such as a mouse, a keyboard, a touch panel, a button, a microphone, a switch, or a lever, and an input control circuit which generates an input signal based on the input by the user and outputs the generated input signal to the CPU 801. The user of the display control device 100 can input various kinds of data to the display control device 100 and can instruct the display control device 100 to perform a processing operation by operating the input device 808.

The output device 810 includes, for example, a display device such as a liquid crystal display (LCD) device, an organic light emitting diode (OLED) device, or a lamp. Further, the output device 810 includes an audio output device such as a speaker or headphones. For example, a display device displays an image that has been imaged or an image that has been generated. On the other hand, an audio output device converts audio data or the like into audio and outputs the audio.

The storage device 811 is a device for storing data configured as an example of a storage of the display control device 100. The storage device 811 may include, for example, a storage medium, a recording device for recording data in the storage medium, a reading device for reading out the data from the storage medium, and a deletion device for deleting the data recorded in the storage medium. The storage device 811 stores a program executed by the CPU 801 and various data.

The drive 812 is a reader/writer for the storage medium and is built in or externally attached to the display control device 100. The drive 812 reads out information recorded in a removable storage medium which is mounted thereto, such as a magnetic disk, an optical disc, a magneto-optical disk, or a semiconductor memory, and outputs the information to the RAM 803. Further, the drive 812 can also write information in the removable storage medium.

The imaging device 813 includes an imaging optical system such as an imaging lens or a zoom lens for condensing light, and a signal conversion device such as a charge coupled device (CCD) or a complementary metal oxide semiconductor (CMOS). The imaging optical system condenses light emitted from a subject and forms a subject image in a signal conversion part, and the signal conversion device converts the formed subject image into an electrical image signal.

The communication device 815 is a communication interface configured from a communication device or the like for establishing a connection with a network. In addition, the communication device 815 may be a wireless local area network (LAN) enabled communication device, a long term evolution (LTE) enabled communication device, or a wired communication device for performing wired communication. The communication device 815 is capable of communicating with another device through a network.

Heretofore, a hardware configuration example of the display control device 100 has been described.

<<6. Conclusion>>

As described above, according to an embodiment of the present disclosure, there is provided the display control device 100 including the display controller 114 configured to cause the display part 170 to display a first captured image Im10, wherein, in a case where a modification target region R1 is detected from the first captured image Im10, the display controller 114 causes the display part 170 to display a composite image Im90 in which a part or all of a second captured image is composited on the modification target region R1 . According to such a configuration, the modification target region included in the captured image can be modified more accurately.

It should be understood by those skilled in the art that various modifications, combinations, sub-combinations and alterations may occur depending on design requirements and other factors insofar as they are within the scope of the appended claims or the equivalents thereof.

Further, it is also possible to create a program for causing hardware such as a CPU, ROM, and RAM, which are built in a computer, to exhibit substantially the same functions as those of respective functions of the display control device 100 described above. Further, there is also provided a computer-readable recording medium having the program recorded thereon.

Additionally, the present technology may also be configured as below.

(1) A display control device including:
a display controller configured to cause a display part to display a first captured image,
wherein, in a case where a modification target region is detected from the first captured image, the display controller causes the display part to display a composite image in which a part or all of a second captured image is composited on the modification target region.

(2) The display control device according to (1),
wherein, in a case where a modification target region is detected from the first captured image, the display controller changes a display of a given position based on a position of the modification target region.

(3) The display control device according to (1) or (2),
wherein the display controller causes the display part to display an imaging position or guidance suggesting changing an imaging direction at a time of imaging the second captured image.

(4) The display control device according to (3),
wherein the display controller causes the display part to display recommendation information indicating a direction that is recommended as an imaging direction after the change.

(5) The display control device according to (4),
wherein the display controller determines the recommendation information in accordance with a position of the modification target region.

(6) The display control device according to any one of (1) to (5),
wherein the display controller causes the display part to display the first captured image and a through image at a time of imaging the second captured image.

(7) The display control device according to (6),
wherein the display controller changes a display of a given position based on a region corresponding to the through image in the first captured image at a time of imaging the second captured image.

(8) The display control device according to any one of (1) to (7), further including
a compositing part configured to composite a part or all of the second captured image on the modification target region detected from the first captured image.

(9) The display control device according to (8),
wherein the compositing part extracts a region corresponding to the modification target region from the second captured image and composites the extracted region on the modification target region.

(10) The display control device according to (8) or (9),
wherein the compositing part extracts a region corresponding to a region specified in the composite image from the second captured image and composites the extracted region on the composite image.

(11) The display control device according to any one of (1) to (10), further including
a region detection part configured to detect the modification target region from the first captured image.

(12) The display control device according to (11),
wherein the region detection part detects the modification target region on the basis of color information of the first captured image.

(13) The display control device according to (11) or (12),
wherein the region detection part detects the modification target region on the basis of a difference of color information between a pixel of a through image and a corresponding pixel of the first captured image.
(14) The display control device according to (11),
wherein the region detection part detects the modification target region on the basis of an operation performed by a user.
(15) The display control device according to any one of (1) to (14), further including
a position determination part configured to determine corresponding positions between the first captured image and the second captured image on the basis of the first captured image and the second captured image.
(16) The display control device according to any one of (1) to (14), further including
a position determination part configured to determine corresponding positions between the first captured image and the through image on the basis of the first captured image and the through image.
(17) The display control device according to any one of (1) to (16),
wherein the display controller performs trapezoid correction on the first captured image.
(18) The display control device according to any one of (1) to (17), further including
an imaging part configured to image the first captured image and the second captured image.
(19) A display control method including:
causing a display part to display a first captured image; and
in a case where a modification target region is detected from the first captured image, causing the display part to display a composite image in which a part or all of a second captured image is composited on the modification target region.
(20) A non-transitory computer-readable recording medium having a program recorded thereon, the program being for causing a computer to function as a display control device including
a display controller configured to cause a display part to display a first captured image,
wherein, in a case where a modification target region is detected from the first captured image, the display controller causes the display part to display a composite image in which a part or all of a second captured image is composited on the modification target region.

What is claimed is:
1. A display control device comprising:
circuitry configured to
cause a display to display a first captured image;
cause the display to display both the first captured image and a live image at a time of imaging a second captured image, the first captured image including an indication indicating a corresponding region corresponding to the live image, a region indicated by the indication in the first captured image being a different region in the display from a region where the live image is displayed in the display, the corresponding region in the first captured image indicated by the indication being obtained by capturing a same area of a same target object as the live image, in a case where a modification target region is detected from the first captured image; and
cause the display to display a composite image in which a part or all of the second captured image is composited on the modification target region.
2. The display control device according to claim 1,
wherein, in the case where a modification target region is detected from the first captured image, the circuitry changes a display of a given position based on a position of the modification target region.
3. The display control device according to claim 1,
wherein the circuitry causes the display to display an imaging position or guidance suggesting changing an imaging direction at a time of imaging the second captured image.
4. The display control device according to claim 3,
wherein the circuitry causes the display to display recommendation information indicating a direction that is recommended as an imaging direction after the change.
5. The display control device according to claim 4,
wherein the circuitry determines the recommendation information in accordance with a position of the modification target region.
6. The display control device according to claim 1,
wherein the circuitry composites a part or all of the second captured image on the modification target region detected from the first captured image.
7. The display control device according to claim 6,
wherein the circuitry extracts a region corresponding to the modification target region from the second captured image and composites the extracted region on the modification target region.
8. The display control device according to claim 6,
wherein the circuitry extracts a region corresponding to a region specified in the composite image from the second captured image and composites the extracted region on the composite image.
9. The display control device according to claim 1,
wherein the circuitry detects the modification target region from the first captured image.
10. The display control device according to claim 9,
wherein the circuitry detects the modification target region on the basis of color information of the first captured image.
11. The display control device according to claim 9,
wherein the circuitry detects the modification target region on the basis of a difference of color information between a pixel of the live image and a corresponding pixel of the first captured image.
12. The display control device according to claim 9,
wherein the circuitry detects the modification target region on the basis of an operation performed by a user.
13. The display control device according to claim 1,
wherein the circuitry determines corresponding positions between the first captured image and the second captured image on the basis of the first captured image and the second captured image.
14. The display control device according to claim 1,
wherein the circuitry determines corresponding positions between the first captured image and the live image on the basis of the first captured image and the live image.
15. The display control device according to claim 1,
wherein the circuitry performs trapezoid correction on the first captured image.
16. The display control device according to claim 1,
wherein the circuitry images the first captured image and the second captured image.

17. The display control device according to claim 1, wherein the indication indicating the corresponding region corresponding to the live image is a line corresponding to the live image in the first captured image.

18. The display control device according to claim 1, wherein the corresponding region corresponds to the live image visually.

19. The display control device according to claim 1, wherein the live image is an image imaged by an imaging part and displayed on the display to be captured by pressing an imaging button.

20. A display control method comprising:

causing a display to display a first captured image;

causing, using circuitry, the display to display both the first captured image and a live image at a time of imaging a second captured image, the first captured image including an indication indicating a corresponding region corresponding to the live image, a region indicated by the indication in the first captured image being a different region in the display from a region where the live image is displayed in the display, the corresponding region in the first captured image indicated by the indication being obtained by capturing a same area of a same target object as the live image, in a case where a modification target region is detected from the first captured image; and causing the display to display a composite image in which a part or all of the second captured image is composited on the modification target region.

21. A non-transitory computer-readable recording medium including executable instructions, which when executed by a computer cause the computer to:

cause a display to display a first captured image;

cause the display to display both the first captured image and a live image at a time of imaging a second captured image, the first captured image including an indication indicating a corresponding region corresponding to the live image, a region indicated by the indication in the first captured image being a different region in the display from a region where the live image is displayed in the display, the corresponding region in the first captured image indicated by the indication being obtained by capturing a same area of a same target object as the live image, in a case where a modification target region is detected from the first captured image; and cause the display to display a composite image in which a part or all of the second captured image is composited on the modification target region.

* * * * *